(12) United States Patent
Moretti et al.

(10) Patent No.: US 8,988,199 B1
(45) Date of Patent: Mar. 24, 2015

(54) RFID TAG PARAMETER ESTIMATION USING READ DIFFICULTY FACTOR

(75) Inventors: Vincent C. Moretti, Kenmore, WA (US); Robert C. Collins, Burien, WA (US)

(73) Assignee: Impinj, Inc., Seattle, WA (US)

( * ) Notice: Subject to any disclaimer, the term of this patent is extended or adjusted under 35 U.S.C. 154(b) by 272 days.

(21) Appl. No.: 13/249,182

(22) Filed: Sep. 29, 2011

Related U.S. Application Data

(60) Provisional application No. 61/389,118, filed on Oct. 1, 2010.

(51) Int. Cl.
*H04Q 5/22* (2006.01)
(52) U.S. Cl.
USPC ..... 340/10.41; 340/10.1; 340/10.2; 340/10.3; 340/10.4; 340/10.5; 340/572.1; 340/572.4; 340/572.7; 340/568.1; 340/870.11; 235/383
(58) Field of Classification Search
CPC ............ G06K 7/0008; G06K 19/0723
USPC ............ 340/10.1, 10.2, 10.3, 10.4, 572.1, 340/572.4, 568.1, 870.11; 235/383
See application file for complete search history.

(56) References Cited

U.S. PATENT DOCUMENTS

| 7,202,784 | B1* | 4/2007 | Herwig ..................... 340/568.1 |
| 7,772,978 | B1* | 8/2010 | Somogyi et al. ........... 340/572.4 |
| 2007/0063817 | A1* | 3/2007 | Cherry ......................... 340/10.1 |
| 2008/0106385 | A1* | 5/2008 | Kelley et al. ................. 340/10.5 |
| 2008/0150694 | A1* | 6/2008 | Olsen et al. ................... 340/10.1 |
| 2008/0211631 | A1* | 9/2008 | Sakamoto ..................... 340/10.1 |
| 2008/0272888 | A1* | 11/2008 | Cardwell et al. ............. 340/10.1 |
| 2009/0115582 | A1* | 5/2009 | Kim ............................. 340/10.2 |
| 2009/0145965 | A1* | 6/2009 | Davis et al. .................... 235/383 |
| 2009/0146792 | A1* | 6/2009 | Sadr et al. ..................... 340/10.3 |
| 2009/0167502 | A1* | 7/2009 | Erickson et al. ............. 340/10.3 |
| 2010/0060452 | A1* | 3/2010 | Schuster et al. ............ 340/572.1 |
| 2010/0085190 | A1* | 4/2010 | Sueoka ....................... 340/572.7 |
| 2010/0127875 | A1* | 5/2010 | Wong ......................... 340/572.7 |
| 2010/0201496 | A1* | 8/2010 | Schillmeier et al. ......... 340/10.4 |
| 2011/0080267 | A1* | 4/2011 | Clare et al. ................... 340/10.4 |
| 2012/0019399 | A1* | 1/2012 | Vargo et al. .............. 340/870.11 |

* cited by examiner

*Primary Examiner* — Benjamin C Lee
*Assistant Examiner* — Israel Daramola
(74) *Attorney, Agent, or Firm* — Turk IP Law, LLC

(57) ABSTRACT

A Radio Frequency Identification (RFID) system uses read difficulty factors (RDFs) to improve tag-parameter estimation. During inventory, a reader can obtain a tag's item identifier (II), determine a read metric such as a received signal strength indicator (RSSI), retrieve an RDF associated with the II, and adjust the RSSI using the RDF to more accurately estimate a tag parameter such as distance from the reader antenna. The system can then use the estimated distance to categorize the tag.

17 Claims, 12 Drawing Sheets

RFID SYSTEM

RFID SYSTEM

RFID TAG

ARCHITECTURE OF INTERFACE CONVERTER
WITH AGENT AND UTILITY

SAMPLE SCREENSHOT OF INTERFACE
CONVERTER EXPOSING TO AGENT OPTIONS TO
CONTROL FUNCTIONALITY OF DISTANCE
ESTIMATION UTILITY

RFID TAG PARAMETER ESTIMATION USING READ DIFFICULTY FACTOR

CROSS REFERENCE TO RELATED APPLICATIONS

This application claims the benefit of U.S. Provisional Patent Application Ser. No. 61/389,118 filed on Oct. 1, 2010. The disclosures of the provisional patent application are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying items to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna and an RFID integrated circuit (IC) including a radio section, a power management section, and frequently a logical section, a memory, or both. In some RFID tags the power management section employs an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

An RFID system may be used to discriminate between desired tagged items and undesired tagged items. Undesired tags are also referred to as "stray tags". Improving the sensitivity and accuracy of the discrimination process may increase the overall performance of the RFID system.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

An RFID system can discriminate desired from undesired tagged items by estimating and using RFID parameters such as tag velocity and tag distance to an RFID reader antenna. RFID systems include, for example, Point-of-Sale (POS) systems that may need to distinguish between tagged items placed on a counter and other tagged items nearby, and inventory management systems that may need to communicate with a desired group of tags and exclude stray tags which may be in the vicinity but not desired to be interrogated. RFID systems may use a variety of read metrics to estimate these tag parameters so as to distinguish desired items from strays. One metric may include an RF characteristic of the signal returned by the tag (e.g. signal strength, phase, Doppler frequency shift). Another may include the reader state when the read occurred (e.g., time of read, antenna on which the tag was read, state of the antenna, number of antennas reading the tag, etc.). Unfortunately, environmental conditions may affect some of these metrics, such as received tag signal strength, and skew the metric. For example, two tagged items may be the same distance from a reader. The first item may be made from an RF transparent material such as paper, while the second may be made from an RF absorbing material such as a liquid-filled bottle, in which case the received signal strength from the tag on the first item may be higher than that from the tag on the second item, causing the reader to erroneously conclude that the first item is closer than the second item.

Embodiments are directed to improving reader-to-tag parameter estimation, such as tag distance to the reader antenna, using a read difficulty factor (RDF). An RFID system may inventory an RFID tag to obtain an item identifier (II). The item identifier is a number stored in the tag to identify the item to which the tag is attached. The RFID system may also determine one or more read metrics during the inventory process. Read metrics may include a received tag signal strength indicator (RSSI) value, a time of a tag read, a Doppler frequency shift, a RF phase, a reader antenna on which a tag is read, an antenna state at a tag read time, a number of antennas on which a tag was read during a time interval, and/or a number of tag reads during a time interval. The RFID system may then determine the RDF associated with the read II. The determination can be via a look-up of the RDF in a local or remote database, a computation based on a formula, or even from an RDF value transmitted by the tag. The RFID system may then estimate a tag parameter, such as tag distance to the reader antenna, based on the RDF and the one or more determined read metrics. For example, the RFID system may adjust a received RSSI based on the RDF and optionally other metrics and use the adjusted RSSI to estimate the tag distance. The system may then categorize the item based on the estimated parameter. Categories may include desired/stray or other any other suitable categories.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, a "memory" is one of ROM, RAM, SRAM, DRAM, NVM, EEPROM, FLASH, Fuses, and FRAM. Some memories or memory portions may be writeable and some not. "Singulation" refers to choosing or isolating a single tag from a population of tags. "Command" refers to a request for a tag to perform one or more actions. "Inventory" is a series of communications between a reader and one or more tags which singulates the tags. The tags provide information stored in their memory such as electronic product codes (EPCs). An "EPC" is one example of an "item identifier" (II) and may be numeric or may be a numeric representation such as an alphanumeric string stored in tag memory. An II may also include a tag identifier (TID), a key identifier (KID), a unique item identifier (UII), and a serialized trade identification number (SGTIN).

Figure 1:
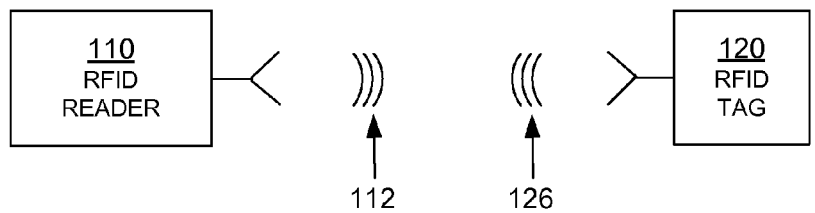
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
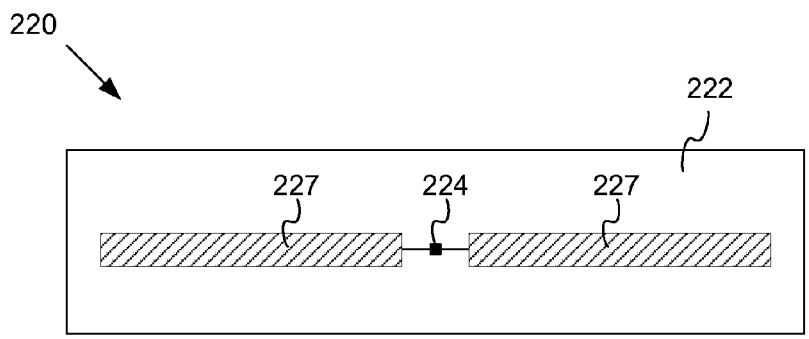
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224 (also referred to as chip). IC 224 is arranged on inlay 222.

Tag 220 also includes an antenna for exchanging wireless signals with its environment. The antenna is usually flat and formed on inlay 222. IC 224 is electrically coupled to the antenna via suitable antenna connections (not shown in FIG. 2).

The antenna may be made in a number of ways, as discussed in more detail below. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna connections of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna connections of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
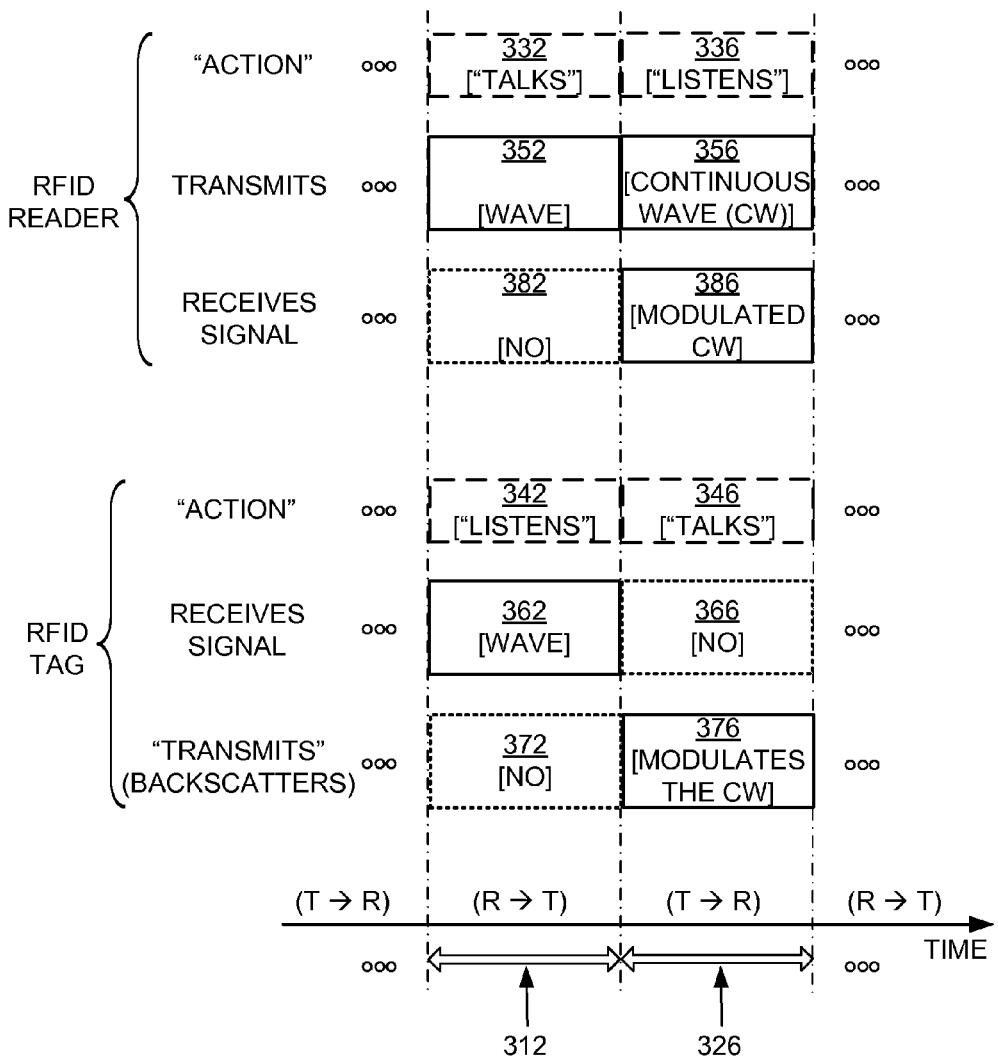
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

An order, a timing, and/or other characteristics of RFID communications may be defined by industry and/or government standards. For example, the Class-1 Generation-2 UHF RFID Protocol for Communications at 860 MHz-960 MHz ("Gen2 Specification") by EPCglobal, Inc. is one such standard. The contents of the Gen2 Specification version 1.2.0 are hereby incorporated by reference.

Figure 4:
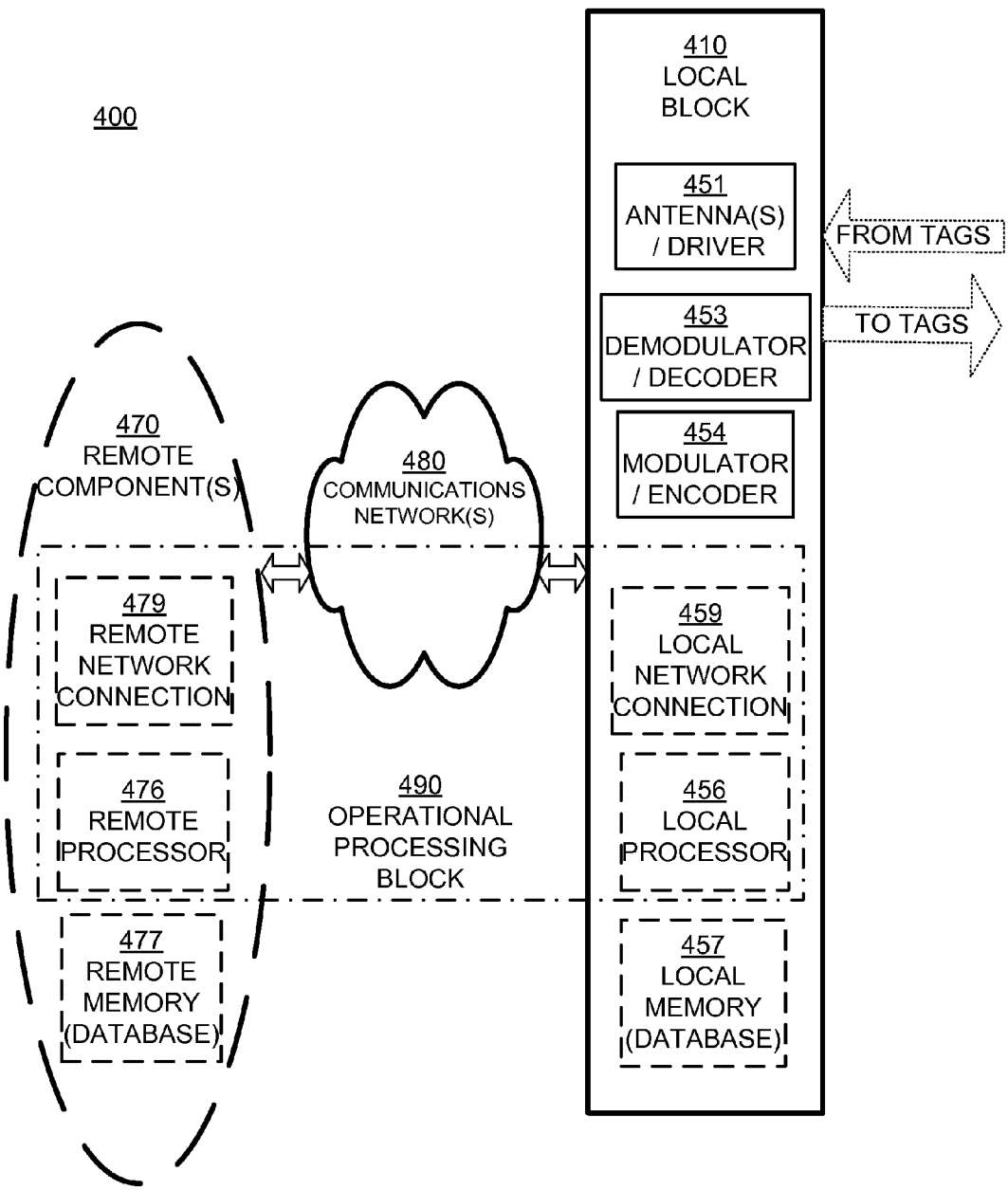
FIG. 4 is a block diagram showing a detail of an RFID reader, such as the one shown in FIG. 1.

FIG. 4 is a block diagram of an RFID reader 400 according to embodiments. RFID reader 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader 400, of which only the local block 410 is shown in FIG. 1.

Local block 410 is responsible for communicating with tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an item categorization process based on an RDF-adjusted tag-distance estimation; in some cases one or more of the item categorization functions can be distributed among other blocks, or may be entirely incorporated in another block.

Local block 410 additionally includes an optional local memory 457. Local memory 457 may be implemented in any number of ways known in the art and may be any type of memory as described above. Local memory 457 can be implemented separately from local processor 456, or in a single chip with local processor 456, with or without other components. Local memory 457, if provided, can store programs for local processor 456 to run, if needed.

In some embodiments local memory 457 stores data read from tags or data to be written to tags, such as IIs and read metrics. Local memory 457 can also include reference data associated with the IIs, instructions and/or rules for how to encode commands for the tags, modes for controlling antenna 451, instructions and order of instructions to be sent to the tags, and so on. In some of these embodiments, local memory 457 is provided as a database.

Some components of local block 410 typically treat data as analog, such as antenna/driver block 451. Other components such as local memory 457 typically treat data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections.

Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement item-categorization based on RDF-adjusted tag-distance estimation, similar to local processor 456.

Remote component(s) 470 can also include a remote memory 477. Remote memory 477 can be made in any way known in the art, such as was described with reference to local memory 457. Remote memory 477 may include a database, such as one that can reference IIs. Remote memory 477 may also contain information associated with command, tag profiles, instructions, instruction parameters, RDF values and corresponding Hs, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
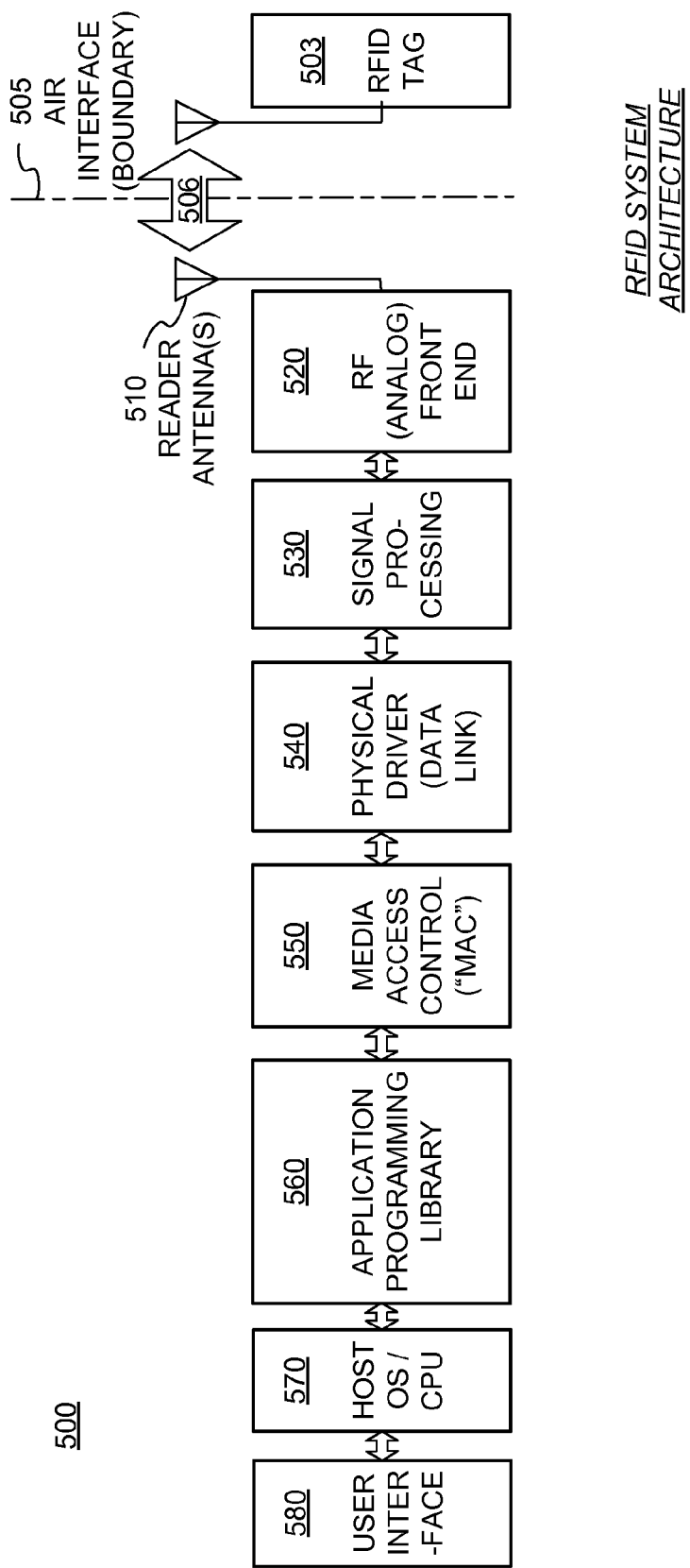
FIG. 5 is a block diagram illustrating an RFID system architecture according to embodiments.

FIG. 5 is a block diagram illustrating an overall architecture of an RFID system 500 according to embodiments. It will be appreciated that RFID system 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front end module 520 for interfacing with reader antenna(s) 510. These can be made as described above.

RFID system 500 also includes a signal-processing module 530. In one embodiment, signal-processing module 530 exchanges waveforms with RF front end module 520.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550, which is also known as MAC layer module. In one embodiment, MAC layer module 550 exchanges packets of bits with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with implementing item categorization using the RDF.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

As mentioned previously, embodiments are directed to RDF-based parameter estimation. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways as described above, some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Figure 6:
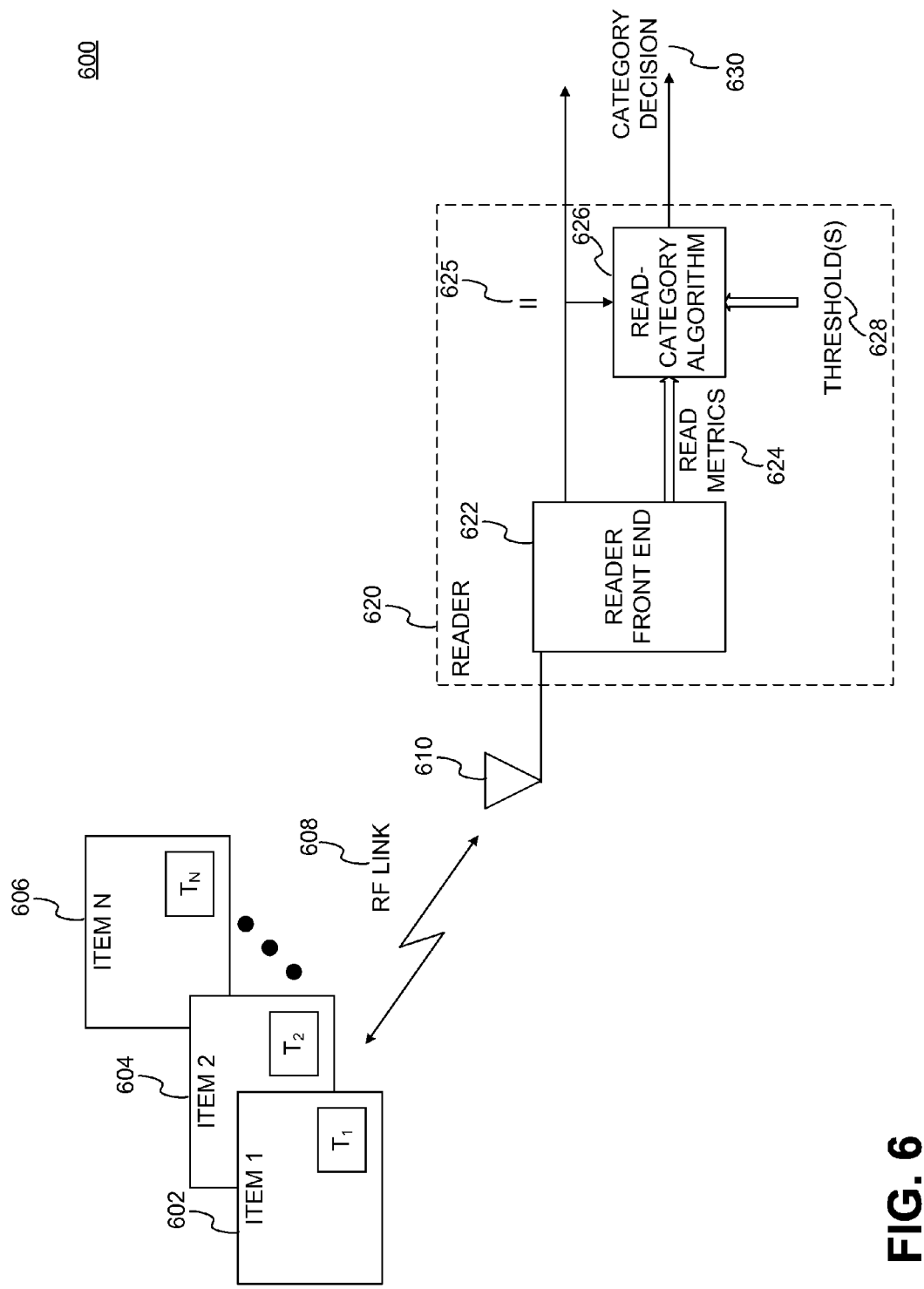
FIG. 6 is a diagram illustrating an example RFID system employing a read-category algorithm processing block to categorize tagged items.

FIG. 6 is a diagram illustrating an example RFID system employing a read-category algorithm processing block to categorize tagged items.

According to some embodiments, a reader may inventory a population of items 1-N (602, 604, 606) via RF link 608. Each item includes an attached tag ($T_1$-$T_N$). The tagged item may be identified at a product level (e.g., this item is a specific type of medication) and/or at a product category level (e.g., this item is medication). The tags may store additional information associated with the items such as date of manufacture, expiration date, manufacturer, lot number, and the like. Items may be identified by their corresponding tags via an II as described above.

In a typical operation, reader 620 communicates with tags $T_1$-$T_N$ by transmitting one or more commands from its front end 622 through antenna 610, thereby establishing RF link 608. Each tag may respond with its II 625 among other things. In addition to receiving the IIs 625 from the tags, the reader front end 622 may also measure/record one or more metrics 624. For example, reader front end 622 may measure an RSSI for each tag, a time of tag response, a phase of tag response, and other metrics. An II 625 and metrics 624 are then input to a read-category algorithm processing block 626 implementing a read-category algorithm for categorizing the items based in part on one or more parameters. For example, an item may be categorized based on the direction of movement of its associated tag and/or the distance from its associated tag to the reader antenna. The read-category algorithm processing block 626 may be implemented in hardware (e.g., on operational processing block 490 described in FIG. 4) or as software programs executing on hardware. According to some embodiments, one of the inputs to the read-category algorithm implemented by processing block 626 may be an RDF determined from the II received from that tag. Configurable categorization threshold(s) 628 may also be provided to the read-category algorithm processing block 626 for outputting item category decision(s) 630.

The read-category algorithm implemented by processing block 626 may use "bins" to categorize RDF-adjusted tag-distance estimates into groups. Bins simplify the categorization process, and enable the system to implement a simplified tagged item classification. The outputted categories may include, but are not limited to, near/far, desired/stray/uncertain, genuine/counterfeit, damaged/undamaged, moving/stationary, or other similar categories.

Figure 7:
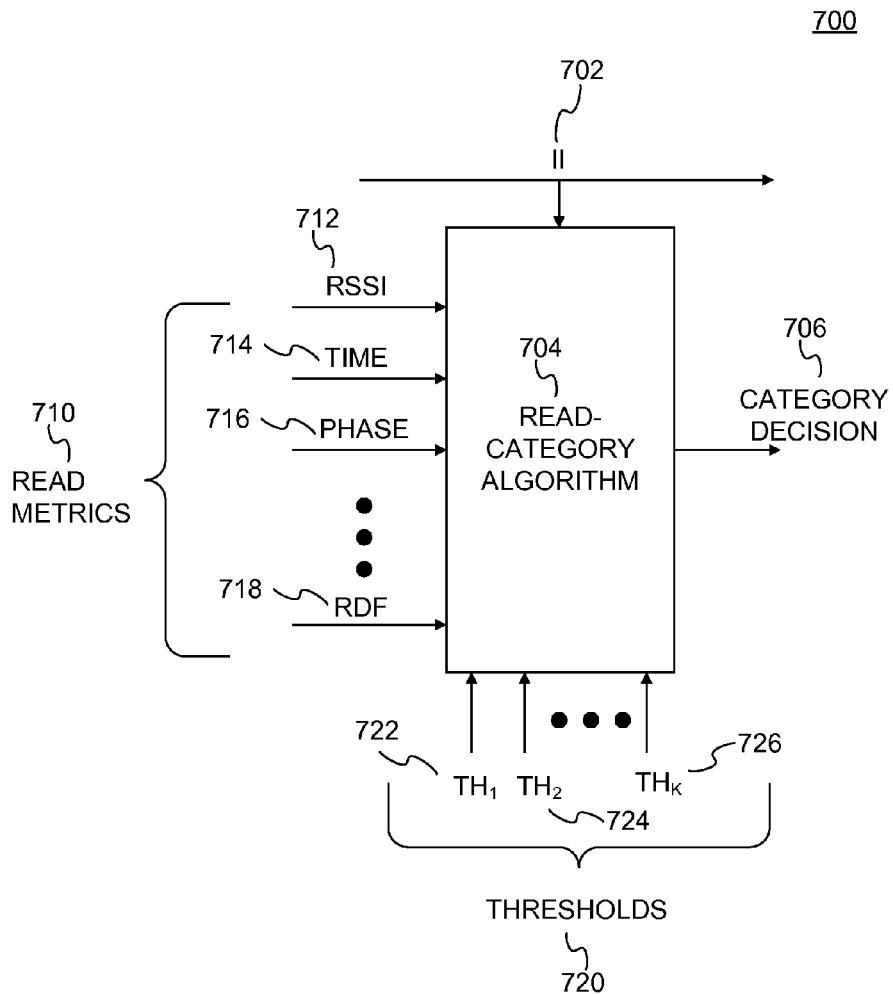
FIG. 7 illustrates, conceptually, inputs and output of an example read-category algorithm for categorizing tagged items.

FIG. 7 illustrates, conceptually, inputs and output of an example read-category algorithm for categorizing items based on metrics and thresholds.

As discussed above, a read-category algorithm 704 accepts metrics 710, II 702, and thresholds 720 as input. The metrics 710 may include RSSI 712, time of tag response 714, phase of tag response 716, and other measured or recorded information associated with the tag response. Metrics 710 may further include RDF 718. RDF values may be assigned to tagged items based on the items' form or composition, based on analysis, or as a result of measurements. The RDF values may be stored at a network-accessible external database or a local reader database and can be looked up by II or similar method. The RDF values may also be stored in tag memory according to some embodiments and transmitted to an inventorying reader. Alternatively the inventorying reader may be configured to calculate the RDF, or to access another device to perform the calculation. An address of a database or tag memory or device where a particular RDF is stored or calculated may be referred to as an "index", in which case the look-up process may include determining an index from an II, then looking up the RDF value at the determined index. Regardless of the method, a reader may use the RDF to adjust its tag parameter estimate. In some embodiments the RDF is determined from testing the tag attached to an item. In some embodiments the RDF is averaged from a plurality of tag reads for a class of items. In some embodiments the RDF is time varying based on a read-history profile and in some embodiments the RDF can be further based on a physical location for the item.

Thresholds 720 include any threshold $TH_1$ 722, $TH_2$ 724 through $TH_K$ 726. Thresholds can be predetermined or adjusted dynamically to alter the output of the read-category algorithm 704, such as to improve the accuracy of category decision 706. Additionally multiple thresholds (1-K) can be used to determine the category selection such as near, far, desired, uncertain, stray, genuine or counterfeit, etc.

The read-category algorithm 704 may be implemented by a general-purpose or special-purpose processor of an RFID reader or by a controller in communication with the reader. In some embodiments, the category decision may be made at the reader and transmitted to a controller. In other embodiments, the decision may be made at a controller based on data provided by the reader. In some embodiments the reader or controller may take an action in response to the category decision. For example, in response to determining an item as stray, a reader may disregard its tag's response (or be instructed to disregard its tag's response). According to another example, in response to determining a tagged item as counterfeit or damaged the reader (or the controller) may alert a designated party.

Thus, the RDF provides an additional input to a read-category algorithm and as such it may influence how other metrics are combined or evaluated. One or more of the metrics may be combined linearly or nonlinearly. In linear combining the metric values are weighted by a multiplicative scale factor and summed to form a composite metric. Any operation on metric values other than linear is defined to be nonlinear combining. More than one composite metric may be calculated as part of read-category algorithm processing. The read-category algorithm may compare the one or more composite metrics to one or more thresholds 720 to make category decisions.

The RDF may measure how an item can modify an attached tag's returned signal power, phase, Doppler frequency shift, number of reads per time interval, or other metric. According to some embodiments, RDFs may be predetermined through computation, measurement, read history profile, etc. An item may be associated with multiple RDFs (e.g., depending on location and/or environment). Furthermore, RDFs may be defined for item classes (i.e., a group of same or similar products such as printer paper, construction paper, etc.) or for individual items. According to other embodiments RDFs may be determined time-dynamically from sensor inputs or by other means. Sensor inputs can come from tags or via an external interface from components outside of the RFID system.

Figure 8B:
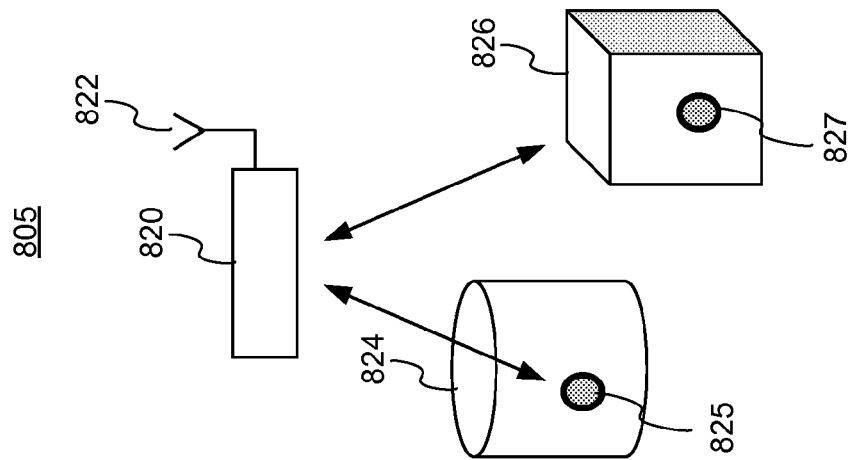
FIGS. 8A and 8B illustrate two example scenarios where tag distance estimates may be affected by tag environment such as form or composition of the items to which the tags are attached.
Figure 8A:
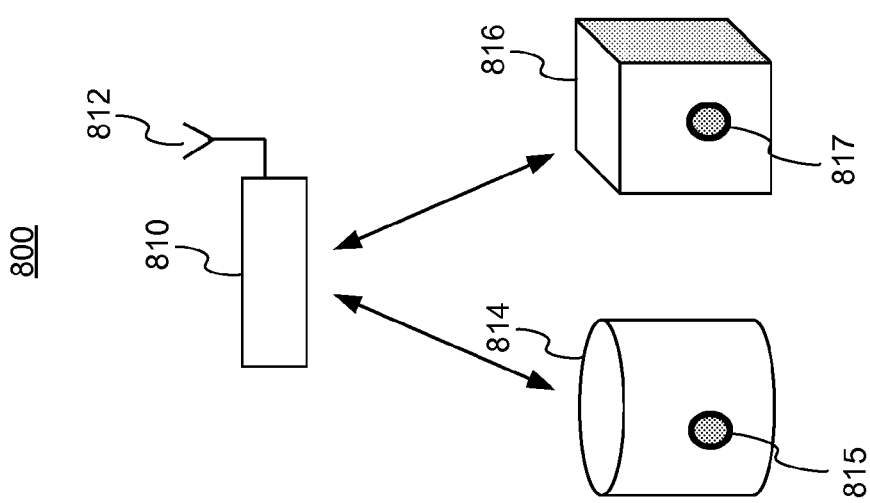

FIGS. 8A and 8B illustrate two example scenarios where tag distance estimates may be affected by the form or composition of the items to which the tags are attached.

Tag distance estimations are often based on a tag's RSSI. For example, a reader may interpret a weak RSSI to represent a distant tag and a strong RSSI a nearby tag. In some cases the distance estimation may be enhanced by time, phase, and other measurements. If the RSSI is attenuated by the item or the environment, such as by dielectric loading by the tagged item, or by other factors such as the tag size (e.g., tags for jewelry are inherently smaller than tags for automobile tires and the size difference can translate into RSSI differences) then the distance estimate by the reader may be skewed.

In diagram 800 of FIG. 8A, reader 810 with antenna 812 interrogates tags 815 and 817 on items 814 and 816, respectively. In this example scenario, tags 815 and 817 are roughly the same distance from reader 810. However, the materials, contents, or physical forms of items 814 and 816 can affect the tags' RSSI. For example, tag 815 may be attached to a liquid-filled item 814 (e.g. a bottle), and tag 817 may be attached to a paper item 816. Even though both items are at approximately the same distance, reader 810 may estimate tag 815 to be further away than tag 817 because the liquid loads the antenna of tag 815 and attenuates the tag's RSSI more than the paper loads the antenna of tag 817. But, by using RDF values for items 814 and 816 (i.e. compensating for the different dielectrics of the two items), reader 810 can adjust the RSSI values to determine that tags 815 and 817 are actually at the same distance.

In diagram 805 of FIG. 8B, reader 820 with antenna 822 interrogates tags 825 and 827 on items 824 and 826, respectively, with similar form and composition as in FIG. 8A. In this example scenario, the items are located at different distances from reader 820. If the reader is trying to determine which item is in a desired zone with a specific location or boundary (such as on a counter at a POS station), it must correctly estimate the distances from antenna 822 to items 824 and 826. However, the items' composition may skew the RSSI values, causing the reader to receive approximately the same RSSI levels from both tags (because liquid-filled item 824 is attenuating its tag's RSSI more than paper item 826 does). The reader may conclude, erroneously, that items 824 and 826 are at the same distance, and therefore both within (or outside of) the desired zone. In a system according to embodiments, however, the reader may adjust its estimates based on RDF values for both items, enabling it to estimate the distances more accurately and categorize the items correctly.

Figure 9:
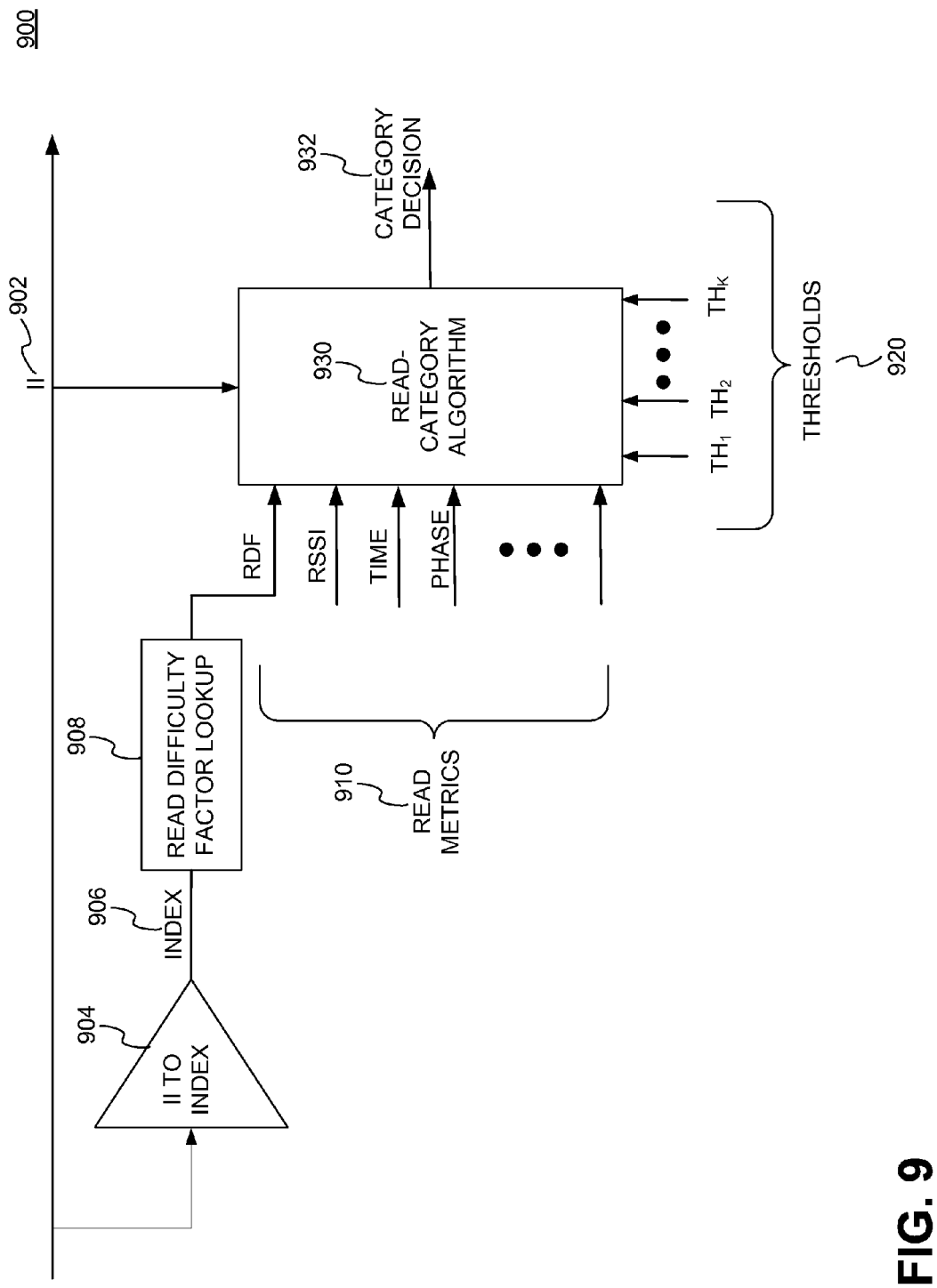
FIG. 9 illustrates an example of using an RDF in an item category decision according to some embodiments.

FIG. 9 illustrates an example use of RDF in improving an item category decision according to some embodiments.

In the example configuration of diagram 900, a received II 902 is provided to a read-category algorithm 930 along with other measured or recorded metrics 910 such as RSSI, time of response, phase of response, or any other suitable metric. On a parallel path, an index 906 for looking up RDF is extracted from the II (904). The index is used to look up the RDF associated with the item identified by the II. The look-up may be performed at a local database of a reader system, at a remote database through a networked connection, or computed at either location. The result of the look-up 908 (the RDF) is also provided as an input to read-category algorithm 930. The algorithm computes an estimated tag distance based on the metrics, adjusts the estimated distance based on the RDF, and compares the estimated distance to one or more thresholds 920, arriving at category decision 932.

Figure 10:
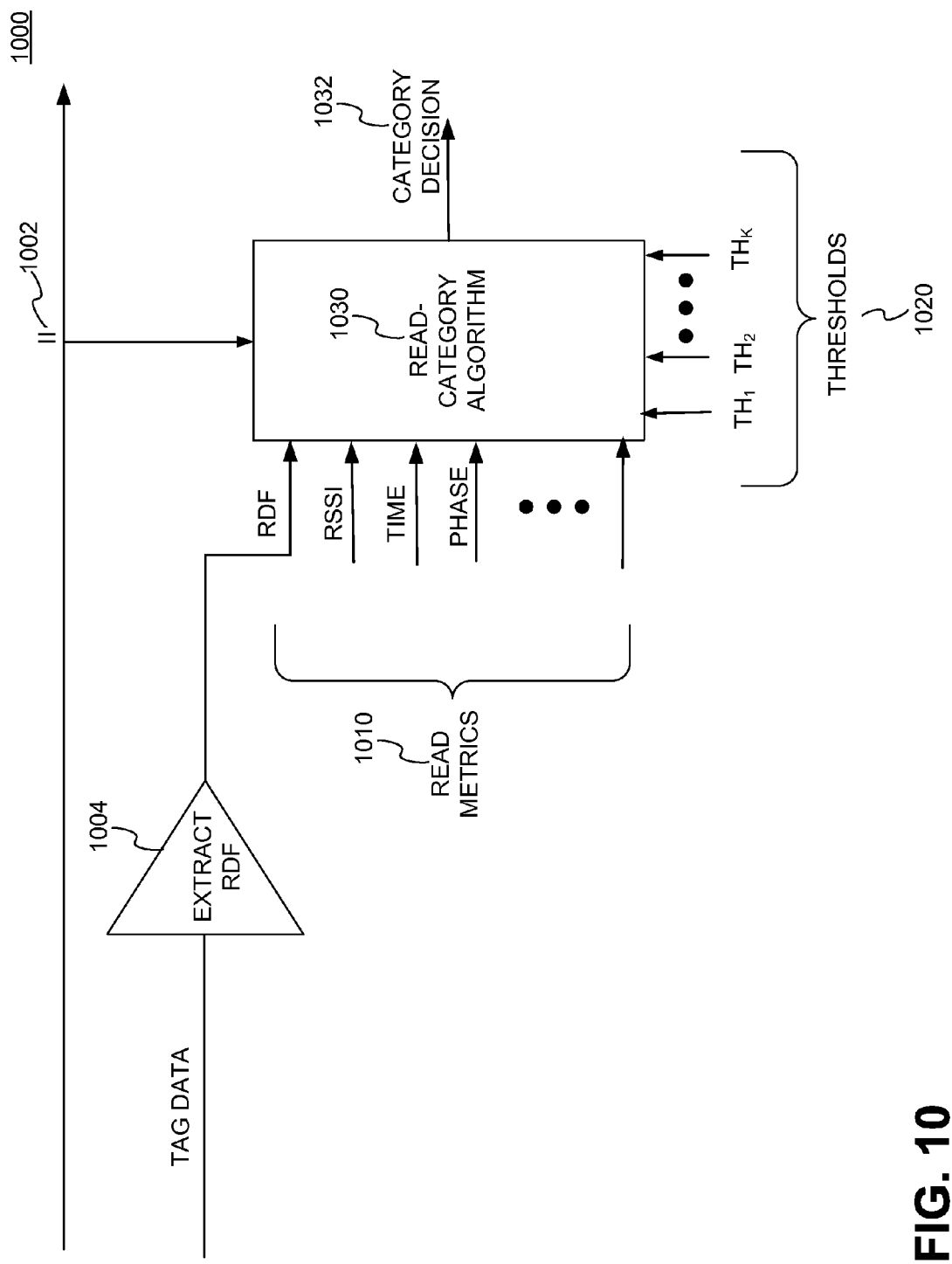
FIG. 10 illustrates another example of using an RDF in an item category decision according to some embodiments.

FIG. 10 illustrates another example use of RDF in improving an item category decision according to some embodiments.

The configuration shown in diagram 1000 is an alternative embodiment to that of diagram 900, in this case with the RDF accessible from tag memory. The RDF may be stored in the memory at any time prior to the read event, such as, for example, at the time of assigning the tag an II, either before or after attaching the tag to the item. Alternatively, the tag may determine its RDF dynamically, such as from a sensor input, and provides the determined RDF to the reader or provides a means (such as a sensor address) by which the reader can extract the RDF. In the example scenario, the reader receives both II 1002 and the means 1004 by which it can extract the RDF from the tag. The extracted RDF is then provided as input to read-category algorithm 1030 along with other metrics 1010 and thresholds 1020, which the algorithm uses to output an item category decision 1032.

As discussed previously, RDF-based tag-distance estimation may be used in POS applications. Items intended for purchase are placed near an RFID-enabled checkout station and read (inventoried) by the RFID system. RDF-based distance estimation may reduce or eliminate stray reads from other merchandise in the store or from items held by other shoppers. RDF-based distance estimation may also enable detection and reporting of damaged or counterfeit items. For example, if the actual distance of a tagged item is known to a reader, and the reader calculates an estimated distance employing RDF-based adjustment which does not match the known distance, the reader can conclude that either the tag (or item) is damaged or the item may be counterfeit with different compositional characteristics. As described above, other uses for RDF-based tag-distance estimation may include inventory applications, shipping and receiving applications, and similar ones.

In some embodiments, RDF values may be used to improve other estimates besides tag distance, such as tag movement (e.g., whether a particular tag is moving and in which direction). As an example of the latter, a received RSSI value lower than an expected RDF-adjusted RSSI value may indicate that there is some problem with the communication link between a tag and a reader.

Embodiments also include methods. Some are methods performed by an RFID reader for estimating tag distance using a RDF. These methods can be implemented in any number of ways, including using the structures described in this document. One such way is by machine operations of devices of the type described in this document. Another way is for one or more of the individual operations to be performed by one or more human operators. These human operators need not be co-located with each other, but each can be with a machine that performs a portion of a program or operation.

Figure 11:
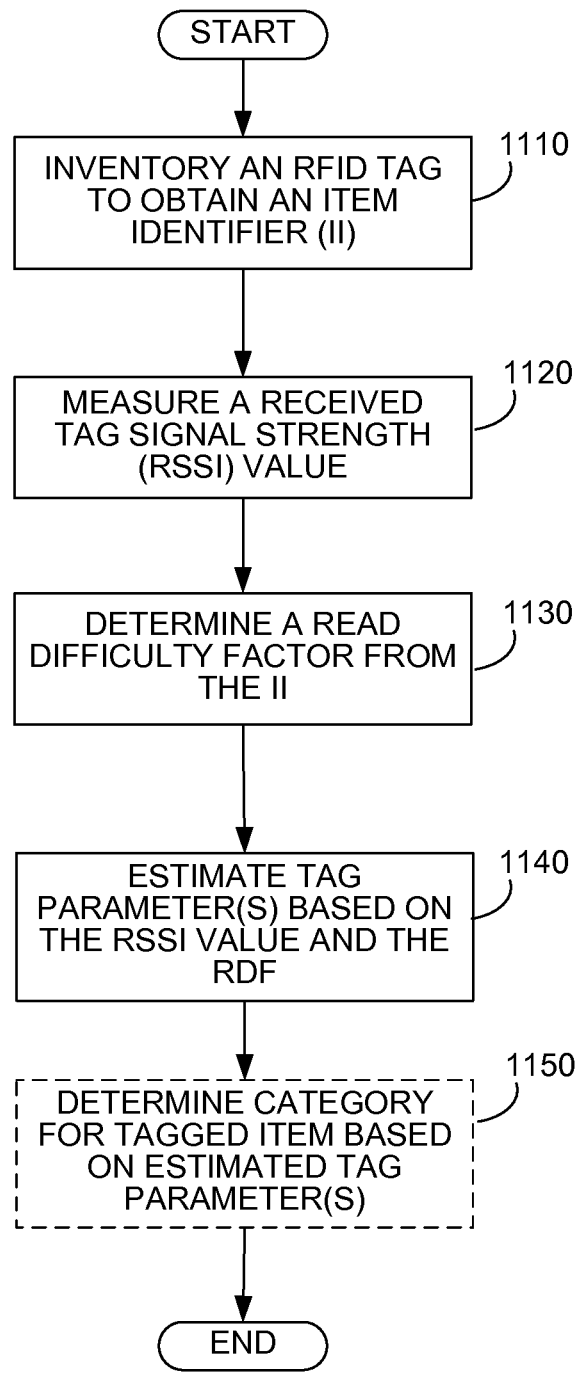
FIG. 11 is a flowchart illustrating an example method of estimating item categories based on RSSI and RDF according to some embodiments.

FIG. 11 is a flowchart illustrating an example method of estimating one or more tag parameters using an RDF value and an RSSI according to embodiments.

The example method begins at operation 1110, where the reader inventories an RFID tag to obtain its II. In operation 1120, the reader measures the tag's RSSI. As described above, a reader can use the RSSI as a metric to help determine a category for the tagged item. At operation 1130, the reader determines the RDF associated with the II. The RDF may be determined by a database lookup or calculation from the II. Alternatively, the RDF can be retrieved from the tag. At operation 1140, the reader estimates a tag parameter such as distance, velocity (e.g., if the tag is stationary with zero velocity, or if the tag is moving, how quickly it is moving), or direction of motion using the RSSI, and optionally other metrics, adjusted by the RDF. At optional operation 1150, the reader may determine an item category based on the estimated parameter(s).

The operations described in process 1100 are for illustrative purposes only. Improving tag parameter estimation using an RDF may be performed employing additional or fewer operations and in different orders using the principles described herein. Of course the order of the operations may be modified, some operations eliminated, or other operations added according to other embodiments.

Figure 12:
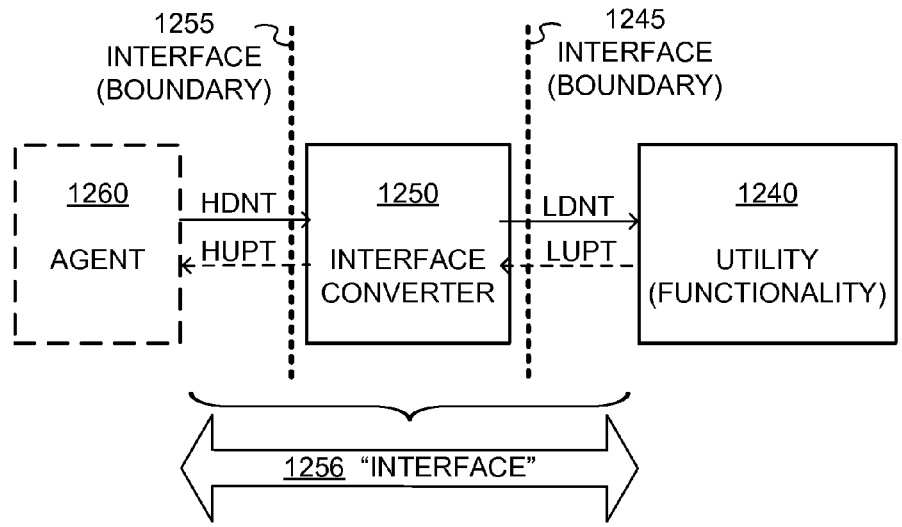
FIG. 12 is a block diagram illustrating an architecture for an interface converter according to embodiments.

FIG. 12 is a block diagram illustrating an architecture 1200 for an interface converter according to embodiments. Architecture 1200 includes a utility 1240, which is a mechanism for performing some or all of the reader features described above.

More particularly, utility 1240 may receive an II and metrics from or about a tag, determine an RDF associated with the II, estimate a parameter of the tag based on the metrics, adjust the estimated parameter using the RDF, and determine a category for the tagged item based on the estimated parameter.

Architecture 1200 additionally includes an interface converter 1250 and an agent 1260. Embodiments also include methods of operation of interface converter 1250. Interface converter 1250 enables agent 1260 to control utility 1240. Interface converter 1250 is so named because it performs a conversion, a change, as will be described in more detail below. Agent 1260, interface converter 1250, and utility 1240 can be implemented in any way known in the art. For example, each can be implemented in hardware, middleware, firmware, software, or any combination thereof. In some embodiments, agent 1260 is a human.

Between interface converter 1250, agent 1260 and utility 1240 there are respective boundaries 1255, 1245. Boundaries 1255, 1245 are properly called interfaces, in that they are pure boundaries, as is the above described air interface.

In addition, it is a sometimes informal usage to call the space between boundaries 1255 and 1245, which includes interface converter 1250, an "interface" 1256. Further, it is common to designate this space with a double arrow as shown, with an understanding that operations take place within the arrow. So, although "interface" 1256 is located at a boundary between agent 1260 and utility 1240, it is not itself a pure boundary. Regardless, the usage of "interface" 1256 is so common for interface converter 1250 that this document sometimes also refers to it as an interface. It is clear that embodiments of such an "interface" 1256 can be included in this invention, if they include an interface converter that converts or alters one type of transmission or data to another, as will be seen below.

Agent 1260 can be one or more layers in an architecture. For example, agent 1260 can be something which a programmer may program. In alternative embodiments, where agent 1260 is a human, interface converter 1250 can include a screen, a keyboard, etc. An example is now described.

Figure 13:
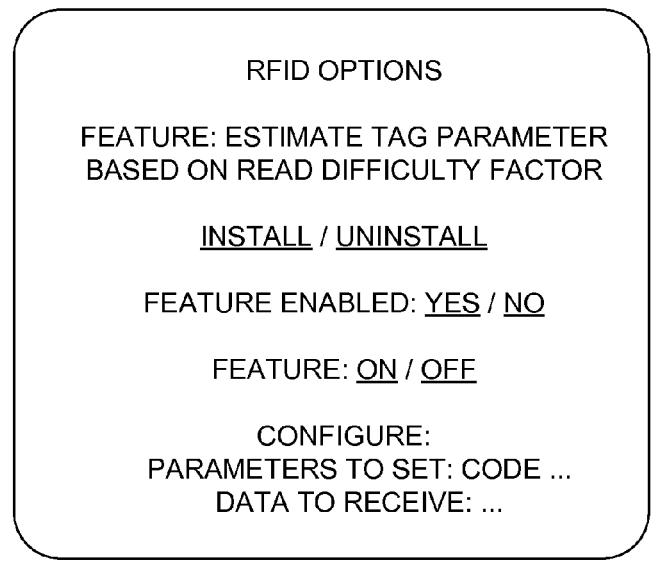
FIG. 13 is a sample screenshot of an interface converter such as the interface converter of FIG. 12, according to an embodiment.

FIG. 13 is a sample screenshot 1350 of an interface converter, such as the interface converter of FIG. 12. Screenshot 1350 can be that of a computer screen for a human agent, according to an embodiment. What is displayed in screenshot 1350 exposes the functionality of a utility, such as utility 1240. Inputs by the user via a keyboard, a mouse, or any suitable user input device can ultimately control utility 1240. Accordingly, such inputs are received in the context of screenshot 1350. These inputs are determined from what is needed for controlling and operating utility 1240. An advantage with such interfacing is that agent 1260 can interact with RFID applications at a higher level, without needing to know how to control lower level RFID operations. Such lower level RFID operations can be as described in the Gen2 Specification, in other lower level protocols, etc. Utility 1240 can be controlled in any number of ways, some of which are now described.

Returning to FIG. 12, one-way interface converter 1250 can be implemented is as a software Application Programming Interface (API). This API may control or provide inputs to an underlying software library.

Communications can be made between agent 1260, interface converter 1250, and utility 1240. Such communications can be as input or can be converted, using appropriate protocols, etc. These communications may encode commands, data, or any other suitable signal(s). In some embodiments, these communications can include one or more of the following: a high-down communication HDNT from agent 1260 to interface converter 1250; a low-down communication LDNT from interface converter 1250 to utility 1240; a low-up communication LUPT from utility 1240 to interface converter 1250; and a high-up communication HUPT from interface converter 1250 to agent 1260. These communications can be spontaneous, in response to another communication, in response to an input or an interrupt, or in response to any suitable signal or condition.

In certain embodiments, communications HDNT and LDNT include commands for ultimately controlling utility 1240. These commands may control utility 1240 in any number of ways. For example, one or more commands may install utility 1240, or just a feature of it. The installation may be performed by spawning, downloading, or any other suitable installation method. Other ways in which commands may be used to control utility 1240 include configuring, enabling, disabling, or operating utility 1240, or just a feature of it. These commands can be standalone, or can carry parameters, such as data, instructions to be stored by tags, etc. In some embodiments interface converter 1250 can convert these commands to a format suitable for utility 1240.

In some embodiments, communications HUPT and LUPT include data. The data may indicate the success or failure of executing an operation. The data can also include tag data, which can be both codes read from tags and data about reading tags (such as RSSI, RDF, etc.). In some embodiments interface converter 1250 can convert the data to a format suitable for agent 1260, including in some cases aggregating, filtering, merging, or otherwise altering the format or utility of the data.

It should be noted that what passes across a single pure boundary is unchanged (by the mere definition of what is a pure boundary). However, signals or communications passing through interface converter 1250 may be changed. More particularly, high-down communication HDNT may have encoding similar to or different from low-down communication LDNT. In addition, low-up communication LUPT may have encoding similar to or different from high-up communication HUPT. If encoding between signals/communications is different, the difference can be attributed to interface converter 1250, which performs a suitable change, or conversion, of one communication to another. The interface converter 1250 may perform changes or conversions in order to expose the functionality of utility 1240 to agent 1260 and vice versa. In some embodiments, a command is converted, but a parameter is passed along without being converted. What is not converted at one module may be converted at another. Such modules taken together can also form an interface converter according to embodiments.

Figure 14:
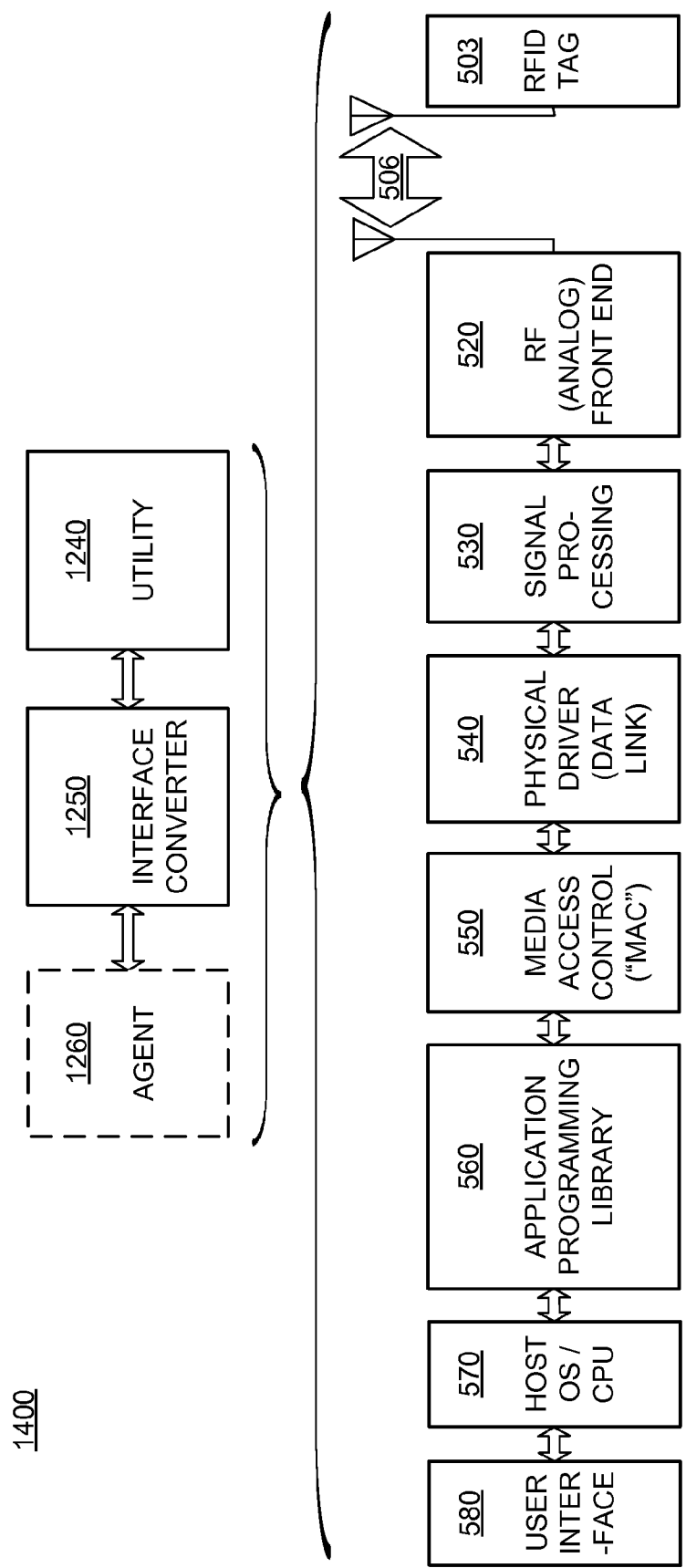
FIG. 14 is a diagram for showing a correspondence for how components of FIG. 12 can be implemented by those of FIG. 5, in embodiments where the interface converter is implemented by a reader.

Agent 1260, interface converter 1250, and utility 1240 can be implemented as part of a reader, or as a different device. In embodiments where the agent 1260, interface converter 1250, and utility 1240 are implemented as part of a reader, FIG. 14 suggests a scheme 1400 where agent 1260, interface converter 1250, and utility 1240 can be implemented in connection with respective reader modules that are suitable, depending on the requirements.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for a Radio Frequency Identification (RFID) system, comprising:
    inventorying an RFID tag to obtain an item identifier (II) indicating an item to which the tag is attached;
    determining at least one read metric, wherein the at least one read metric is determined from at least one of a tag response and a reader state;
    retrieving, based on the II, a read difficulty factor (RDF), wherein the RDF indicates how the item modifies a readability of the tag and was stored prior to the inventorying; and
    estimating a parameter based on the at least one read metric and the RDF, wherein the parameter is at least one of a tag velocity, a tag motion direction, and a tag distance from a reader antenna, and estimating the parameter includes updating the at least one read metric based on the RDF.

2. The method of claim 1, wherein the at least one read metric is RSSI, and estimating the parameter includes updating the RSSI based on the RDF.

3. The method of claim 1, further comprising determining a category for the tagged item by applying a threshold to the estimated parameter, and wherein the category includes at least one of: desired, stray, stationary, moving, near, far, damaged, undamaged, authentic, and counterfeit.

4. The method of claim 1, wherein retrieving the RDF comprises at least one of:
    receiving the RDF from the tag;
    looking-up the RDF from a database;
    calculating the RDF; and
    receiving the RDF from an interface.

5. The method of claim 4, wherein the interface is one of a user interface and a data interface.

6. The method of claim 4, wherein looking-up the RDF from a database comprises:
    deriving an index from the II; and
    looking up the RDF at one of a local database and a remote database using the index.

7. The method of claim 1, wherein the RDF is determined from at least one of:
    a read history profile,
    testing the tag attached to an item,
    a physical location of at least one of a reader and the item, and
    averaging a metric from a plurality of tag reads for a class of items.

8. A Radio Frequency Identification (RFID) system, comprising:
    a communication module configured to communicate wirelessly with an RFID tag;
    a memory; and
    a processing block configured to:
        inventory the RFID tag to obtain an item identifier (II) indicating an item to which the tag is attached;
        determine at least one read metric, wherein the at least one read metric is determined from at least one of a tag response and a reader state;
        retrieve, based on the II, a read difficulty factor (RDF), wherein the RDF indicates how the item modifies a readability of the tag and was stored prior to the inventorying; and
        estimate a parameter based on the at least one read metric and the RDF, wherein the parameter is at least one of a tag velocity, a tag motion direction, and a tag distance from a reader antenna, and wherein the processing block is configured to employ the parameter in determining an item category using a read-category algorithm.

9. The system of claim 8, wherein the at least one read metric is RSSI and the processing block is further configured to estimate the parameter by updating the RSSI based on the RDF.

10. The RFID system of claim 8, wherein the read-category algorithm receives a plurality of read metrics.

11. The RFID system of claim 10, wherein the plurality of read metrics includes at least one of the RDF, a RSSI, a time of the tag read, a Doppler frequency shift, a RF phase, a reader antenna on which a tag was read, a state of antenna at a time a tag was read, a number of antennas on which a tag was read during a time interval, and a number of tag reads during a time interval.

12. The RFID system of claim 10, wherein the read-category algorithm applies to at least one of a linear and a non-linear combining of at least two read metrics in the plurality of read metrics.

13. The RFID system of claim 12, wherein the RDF is used to influence the combining.

14. The RFID system of claim 8, wherein the processing block is at least one of an RFID reader processing block and a controller processing block.

15. An Radio Frequency Identification (RFID) reader, comprising:
    a communication module configured to communicate wirelessly with an RFID tag;
    a memory; and
    a processing block configured to:
        inventory the RFID tag to obtain an item identifier (II) indicating an item to which the tag is attached;
        determine at least one read metric, wherein the at least one read metric is determined from at least one of a tag response and a reader state;
        retrieve, based on the II, a read difficulty factor (RDF), wherein the RDF indicates how the item modifies a readability of the tag and was stored prior to the inventorying;
        estimate a parameter based on the at least one read metric and the RDF, wherein the parameter is tag distance from the reader antenna; and
        determine a category for the tag by applying a threshold to the estimated parameter.

16. The RFID reader of claim 15, wherein the at least one read metric is RSSI, and the processing block is configured to estimate the parameter by updating the RSSI based on the RDF.

17. The RFID reader of claim 15, wherein the RDF is retrieved from one or more of a database, a tag memory, and a tag sensor.

* * * * *